US011580387B2

(12) United States Patent
Schmude et al.

(10) Patent No.: US 11,580,387 B2
(45) Date of Patent: Feb. 14, 2023

(54) COMBINING POINT OBSERVATIONS WITH RASTER DATA FOR MACHINE LEARNING

(71) Applicants: International Business Machines Corporation, Armonk, NY (US); IHI Corporation, Tokyo (JP)

(72) Inventors: Johannes W. Schmude, White Plains, NY (US); Siyuan Lu, Yorktown Heights, NY (US); Hendrik F. Hamann, Yorktown Heights, NY (US); Akihisa Sakurai, Sagamihara (JP); Taku Izumiyama, Bunkyo (JP); Masao Hasegawa, Arakawa (JP)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 16/729,406

(22) Filed: Dec. 29, 2019

(65) Prior Publication Data
US 2021/0201129 A1    Jul. 1, 2021

(51) Int. Cl.
*G06N 3/08* (2006.01)
*G06N 3/063* (2006.01)
*G06N 3/04* (2006.01)

(52) U.S. Cl.
CPC ............. *G06N 3/08* (2013.01); *G06N 3/0445* (2013.01); *G06N 3/0454* (2013.01); *G06N 3/063* (2013.01)

(58) Field of Classification Search
CPC ........ G06N 20/00; G06N 3/0454; G06N 3/08; G06N 3/0445; G06N 3/063
See application file for complete search history.

(56) References Cited

U.S. PATENT DOCUMENTS

| 9,147,272 | B2 | 9/2015 | Ingrassia et al. | |
| 2005/0094879 | A1* | 5/2005 | Harville | G06V 20/64 |
| | | | | 382/209 |
| 2008/0175507 | A1* | 7/2008 | Lookingbill | G06V 30/1456 |
| | | | | 382/255 |
| 2012/0035898 | A1 | 2/2012 | Repelli et al. | |
| 2017/0023702 | A1 | 1/2017 | Smyth et al. | |

(Continued)

FOREIGN PATENT DOCUMENTS

| CN | 106339669 A | * 1/2017 | ......... G06K 9/00362 |
| WO | 2017176112 | 10/2017 | |
| WO | WO-2017176112 A1 | * 10/2017 | ............. G06F 17/18 |

OTHER PUBLICATIONS

Evaluation of Three Deep Learning Models for Early Crop Classification Using Sentinel-1A Imagery Time Series—A Case Study in Zhanjiang, China Published on Nov. 15, 2019 (Year: 2019).*

(Continued)

*Primary Examiner* — Nizar N Sivji
(74) *Attorney, Agent, or Firm* — Daniel Morris; Otterstedt & Kammer PLLC

(57) ABSTRACT

A computer produces predictions throughout a raster field in response to point data, by obtaining a partially empty matrix of point data, filling a matrix of extrapolated raster data by dilating the point data in a first convolutional neural network, and generating a matrix of aggregate raster data by combining the extrapolated raster data with organic raster data in a second convolutional neural network.

17 Claims, 8 Drawing Sheets

(56) References Cited

U.S. PATENT DOCUMENTS

2019/0347551 A1* 11/2019 Lobacheva .......... G06N 3/0445

OTHER PUBLICATIONS

Convolutional Recurrent Deep Learning Model for Sentence Classification—Dec. 2018 (Year: 2018).*
Deep Learning and Its Applications in Biomedicine—Mar. 2017 (Year: 2017).*
DNNs are Largely Multiply-Accumulate—2018 (Year: 2018).*
DSC: Dense-Sparse Convolution for Vectorized Inference of Convolutional Neural Networks—2019 (Year: 2019).*
Economic Machine-Learning-Based Predictive Control of Nonlinear Systems—Jun. 2019 (Year: 2019).*
Learning Spectral-Spatial-Temporal Features via a Recurrent Convolutional Neural Network for Change Detection in Multispectral Imagery—Mar. 2018 (Year: 2018).*
Learning distant cause and effect using only local and immediate credit assignment—Aug. 2021 (Year: 2021).*
Liu et al., Image Inpainting for Irregular Holes Using Partial Convolutions, NVIDIA Corporation, arXiv:1804.07723, Apr. 2018, pp. 1-23.

* cited by examiner

Gridded sensor data

*FIG. 1*

Raster data

*FIG. 2*

$$g = X_0 = matrix\ of\ point\ data$$

$$W = matrix\ of\ weights$$

$$O = matrix\ of\ 1s\ same\ shape\ as\ W$$

$$M_0 = \begin{cases} 0\ if\ X_0\ is\ missing \\ 1\ otherwise \end{cases}$$

For each iteration $i$:

$$P_i = W \times X_{i-1}$$

$$V_i = O \times M_{i-1}$$

$$X_i = \begin{cases} 0\ where\ V_i = 0 \\ \dfrac{P_i}{V_i}\ otherwise \end{cases}$$

$$M_i = \begin{cases} 0\ where\ V_i = 0 \\ 1\ otherwise \end{cases}$$

FIG. 6

$$g = X_0 = matrix\ of\ point\ data$$

$$W_i = matrix\ of\ weights\ at\ layer\ i=1..n$$

$$O_i = matrix\ of\ 1s\ same\ shape\ as\ W_i$$

$$M_0 = \begin{cases} 0\ if\ X_0 is\ missing \\ 1\ otherwise \end{cases}$$

For each layer *i*:

$$P_i = W_i \times X_{i-1}$$

$$V_i = O_i \times M_{i-1}$$

$$X_i = \begin{cases} 0\ where\ V_i = 0 \\ \dfrac{P_i}{V_i}\ otherwise \end{cases}$$

$$M_i = \begin{cases} 0\ where\ V_i = 0 \\ 1\ otherwise \end{cases}$$

*FIG. 9*

COMBINING POINT OBSERVATIONS WITH RASTER DATA FOR MACHINE LEARNING

BACKGROUND

The present invention relates to the electrical, electronic, and computer arts, and more specifically, to machine learning.

Data, whether arising from measurements, predictions or any other process can have several types of spatial dependence. Sensor measurements from weather stations but also moving sensors such as the outside temperature sensors attached to most cars correspond to specific points in space (and possibly time). A census observation on the other hand usually represents an area (e.g., the population in a county or the average income in a certain ZIP code). Images taken by e.g., drones, satellites or planes on the other hand consist of a raster of adjacent pixels, each of which corresponds to a single point usually taken at the center of the pixel. (Technically speaking, the value can also correspond to an aggregate across the pixel.) To establish terminology, the first example of weather stations and cars is referred to as point observations, the second example as polygons and the third as raster data. (Note that point observations are strictly speaking a subclass of polygons.) When dealing with these forms of data, it is often desirable to process them jointly. Specifically, it is often of interest to turn point observations (or polygons in general) into a raster which also contains values for areas for which the original observations contained no data. For example, given the data from three weather stations in close proximity one can combine their observations to make a guess at the value in the middle. Common methods for this are simple nearest neighbor, bilinear, etc. interpolation as well as Kriging.

Kriging is a method of interpolation for which the interpolated values are modeled by a Gaussian process governed by prior covariances. Under suitable assumptions on the priors, kriging gives a linear unbiased prediction of the intermediate values—that is, kriging seeks to produce interpolations close to the most likely values based on the priors. Kriging, however, produces interpolations that are linearly dependent on priors. Kriging also tends to introduce redundancies into the interpolated data.

SUMMARY

Principles of the invention provide techniques for combining point observations with raster data for machine learning. In one aspect, an exemplary method for operating a computer to produce predictions throughout a raster field in response to point data includes obtaining a partially empty matrix of point data <X0>; filling a matrix of extrapolated raster data <Xn> by dilating the point data in a first convolutional neural network; and generating a matrix of aggregate raster data <Xa> by combining the extrapolated raster data <Xn> with organic raster data <Xr> in a second convolutional neural network.

One or more embodiments of the invention or elements thereof can be implemented in the form of a computer program product including a computer readable storage medium with computer usable program code for facilitating the method steps indicated. Furthermore, one or more embodiments of the invention or elements thereof can be implemented in the form of a system (or apparatus) including a memory that embodies computer executable instructions, and at least one processor that is coupled to the memory and operative by the instructions to facilitate exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

In view of the foregoing, techniques of the present invention can provide substantial beneficial technical effects. For example, one or more embodiments provide one or more of:

Rasterization of point data without linear dependencies or redundancies.

These and other features and advantages of the present invention will become apparent from the following detailed description of illustrative embodiments thereof, which is to be read in connection with the accompanying drawings.

BRIEF DESCRIPTION OF THE DRAWINGS

FIG. 1 depicts a grid partially filled with point data;
FIG. 2 depicts a grid filled with raster data;
FIG. 6 depicts a first system of equations for dilating point data to fill a grid;
FIG. 9 depicts a second system of equations for dilating point data to fill a grid.

DETAILED DESCRIPTION

Figures 1, 2:
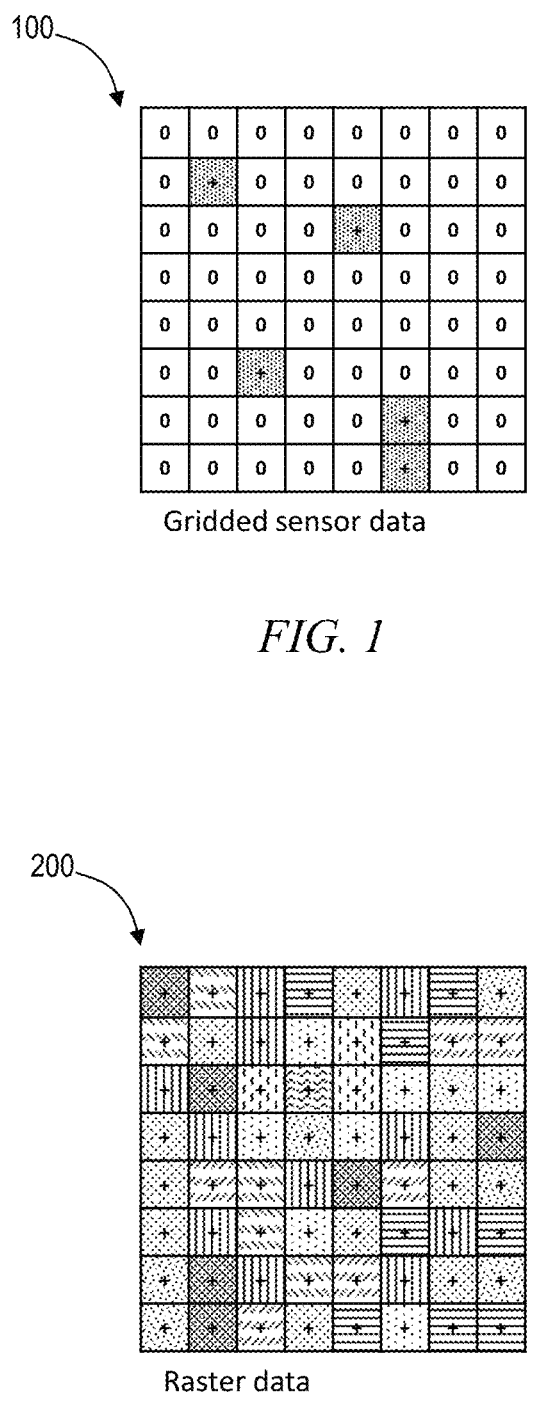
Figure 3:
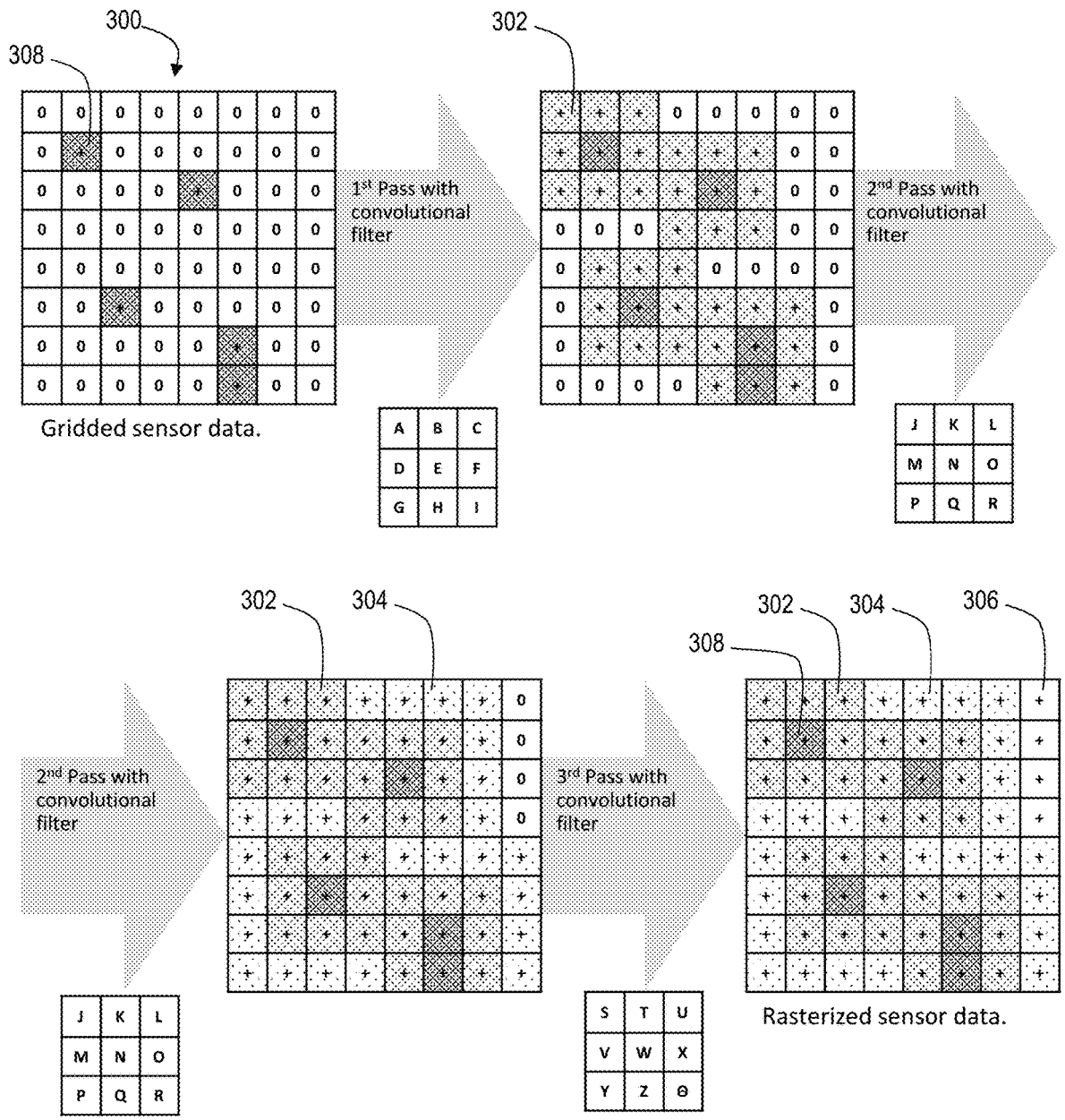
FIG. 3 depicts a sequence of grids being filled with interpolated point data by operation of deconvolution layers.

Historically, predictions or extrapolations of field variables have been accomplished by measuring sequences of values of the variables at points within a grid, applying equations that incorporate time as a variable to extrapolate a prediction from the partially filled grid through time, then interpolating among the points to fill the grid. FIG. 1 depicts a grid 100 partially filled by point measurements of a variable at arbitrary locations and timestamps (the sensors could move; consider satellites, planes, cars, mobile phones). Various techniques, e.g., kriging being popular, are used to interpolate among predicted points to produce a field forecast.

In some embodiments, and in the particular case of weather forecasting, field variables are directly measured throughout a grid using scattering techniques such as laser, radar, x-ray, ultrasound, etc. The same technique of applying field equations with time as a variable then is applied to the measured field in order to extrapolate a prediction through time. FIG. 2 depicts a typical grid 200 fully filled by field measurements or predictions of a variable, such as satellite or drone images or the output of NWP (Numerical Weather Prediction) systems. Applying field equations to a fully filled grid obviates a need to interpolate among points of the grid.

Sometimes, the values of field variables that are obtainable through scattering techniques are not as accurate as are those values available from point measurements. Accordingly, at least one aspect of the present invention provides for combining point measurements with field measurements in a way that permits application of field equations to the combined data set. This can be accomplished by rasterizing or dilating the point measurements to fill the field, in a way superior to kriging the point data. Superior dilation of the point data is accomplished via application of neural networks, specifically convolutional filter layers, to the point data.

Generally, a neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A neural network can implement supervised, unsupervised, or semi-supervised machine learning. A convolutional filter layer is a particular aspect of a neural network, in which each neural unit samples only a selected portion of an input layer as opposed to sampling the entirety of the input layer as in a fully connected layer. Convolutional filters often are used in applications related to computer vision or image processing, because the limited sampling mimics the performance of neurons in the optic nerve bundle. Surprisingly, convolutional filters can be used in both directions, i.e. either to downsample a complex image and thereby generate a simplified version or even a classification of the image, or else to upsample a classification or a simple image to generate a more complex image.

As shown in FIG. 3, measured point sensor data is initially gridded. (In this illustration, fields with data are marked with the symbol '+' and darkly patterned. Fields containing no data are labeled with the symbol '0' and are unpatterned.) Learned convolutional filters dilate the sensor data in several steps over the whole grid. According to an aspect of the invention, the convolutional filter layers are trained on historical point data with historical raster data as the ground truth. Further details are explained below with reference to FIGS. 4 and 6. The objective function is simply whatever objective function is applied to the "output raster." Backpropagation ensures that the weights used in the dilution process are trained as well. Thus, the convolutional filter layers fill a grid 300 with extrapolated raster data 302, 304, 306 by repeatedly dilating from point data 308. Once the point data has been turned into a raster using the dilution operation, it can be handled as a regular raster. Then, one can treat the thus rasterized point data as well as the data that came as different input channels to a standard convolutional neural network. Thus, a convolutional neural network could have a "red", "green" and "blue" input channel, or "infra red", "UV", etc. Here, input channel point data has been rasterized via dilution. The small lettered grids in FIG. 3 represent weight matrices of convolutional neural network layers. The letters are the individual weights. Note that in the implementation of FIG. 4 the same weight matrix is applied repeatedly. On the other hand, in the implementation of FIG. 7 up to n different weight matrices are applied, corresponding to FIG. 3. Dilatation achieved by the convolutional filters rasterizes the point data yet is able to avoid linear dependencies and redundancies in the gridded data. Since the convolutional filters make use of a summation operation, the summation is weighted by the number of points for which data is available.

Figure 4:
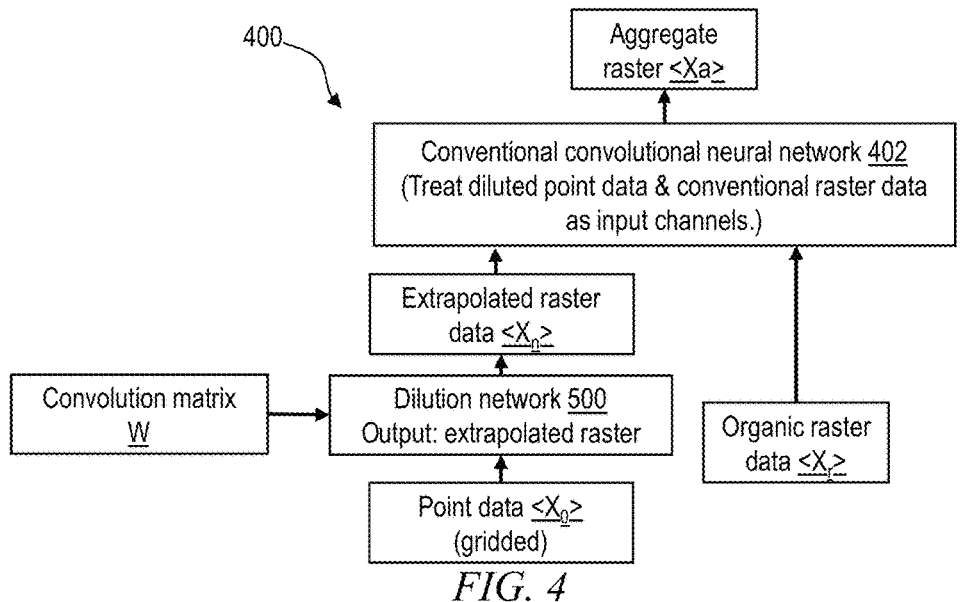
FIG. 4 depicts an overall schematic view of a first neural network architecture for dilating point data to fill a grid.

FIG. 4 depicts an overall view of a first neural network architecture 400 for dilating point data $<X_0>$ to fill the grid 300. The point data $<X_0>$ is input to the architecture 400. A dilution network 500 produces extrapolated raster data $<X_n>$ by repeatedly applying a convolutional filter $<W>$ to the point data $<X_0>$. The convolutional filter $<W>$ has been trained on historical point data with historical raster data as the ground truth. Note that the historical raster data may include measurements, predictions, or both. Then the extrapolated raster data $<X_n>$ are input to a conventional convolutional network 402 along with organic raster data $<X_r>$. The convolutional network 402 outputs an aggregate raster $<X_a>$, which incorporates the extrapolated raster data $<X_n>$, point data $<X_0>$, and regular raster data $<X_r>$. Algorithmically, the procedure is somewhat similar to that used sometimes in "image inpainting" problems. Cf. Liu et al., "Image Inpainting for Irregular Holes Using Partial Convolutions," December 2018 (section 3.1). In contrast to the image inpainting problem, according to at least one embodiment, images where a percentage of pixels has been removed are not considered. Instead, according to some embodiments, it can be assumed that sparse data is being considered. Thus, instead of filling in a small area, sparse observations are dilated to improve coverage of the area. Also, the dilation operates on generic sets of measurements. That is, a set of sensor measurements (e.g., temperature) might constitute a single band, yet the method applies to an arbitrary set of parameters that are recorded at different locations in space and time. For image data, the values in different bands are generally correlated; in the context of the inpainting problem, values from all bands are missing at the same locations. According to some embodiments, there is no need for any relation between the patterns of what is missing and what is not in different bands. Nor does the data generally have any relation between bands or layers. Additionally, a procedure according to an exemplary embodiment can be adapted to the case where different data sources lack data at different locations. (This is done by using one mask per data source/input layer.) This is unlike image inpainting, where all the layers lack pixels in the same places. In contrast to conventional methods, according to at least one embodiment, the masks M that are used for dilation do not only depend on the location in space, but also on the input layer in question. For example, consider a situation with multiple input bands defined on an n-dimensional space. When dealing with inputs in space, n might be two or sometimes three when considering altitude. These inputs can be arranged in an n+1-dimensional tensor $X_0$. The additional dimension being used to discriminate the different input features. Note that each input feature has data present/missing at different locations. Thus, the mask M indicating what data is missing is naturally an n+1 dimensional tensor as well. This is in contrast to conventional methods, where data is generally missing across all bands at the same locations and M is thus simply n dimensional. Regarding applications, image inpainting (i.e., where n=2) is used in image manipulation or semi- or un-supervised learning. Embodiments of the present disclosure extending this to arbitrary tasks.

Figure 5:
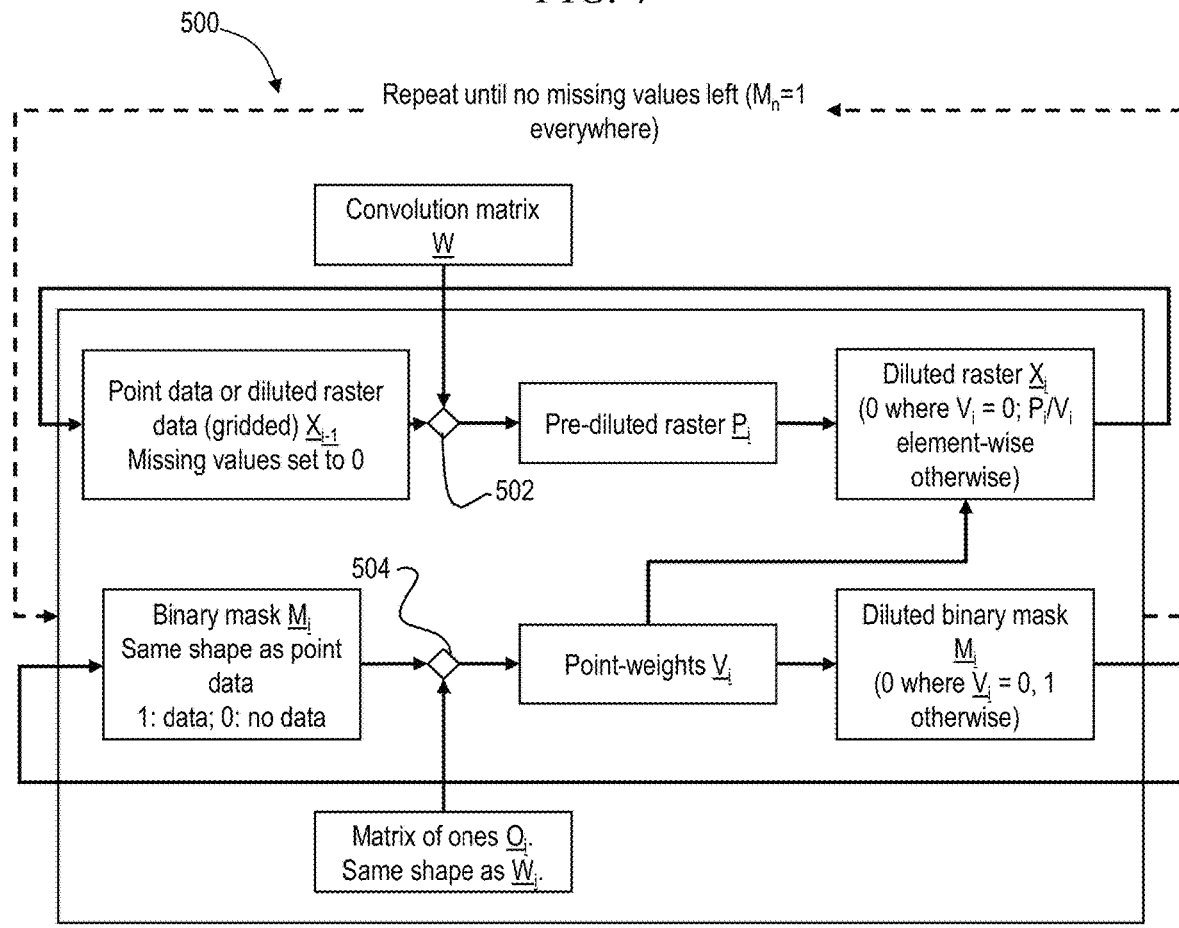
FIG. 5 depicts a detailed schematic view of a first dilution network for obtaining raster data from point data.

FIG. 5 depicts a detailed schematic of the dilution network 500, which takes as input the point data 308 or $<X_0>$. In one or more embodiments, the dilution network 500 is implemented as a recurrent convolutional network (RCNN) that includes a convolution matrix (kernel or filter) $<W>$, a plurality of binary masks $<M_i>$ (i.e. matrices of 1s and 0s in which the 1s match the shape of the point data $<X_0>$ or of the extrapolated raster data $<X_r>$), and a matrix of is $<O>$ that is the same shape as $<W>$. The dilution network 500 also includes a cross-multiplier 502, which produces pre-diluted rasters $<P_i>$ by combining the convolution matrix $<W>$ with the point data $<X_0>$ or with the extrapolated raster data $<X_r>$ (depending whether it is the first instance or a subsequent instance of the RCNN), and a cross-multiplier 504, which produces matrices of point-weights $<V_i>$ by combining the matrix of 1s $<O>$ with the current binary mask $<M_i>$. At each recurrence, the dilution network 500 then combines the matrix of point-weights $<V_i>$ with the pre-diluted raster $<P_i>$ to obtain a diluted raster $<X_i>$ that has 0s where $<V_i>=0$ and values $P_i/V_i$ where $<V_i>$ does not equal 0. That is, given (e.g.) two 3×3 matrices, divide p(1, 1) by v(1, 1), p(1, 2) by v(1, 2) and so on—except where v(i,j)=0. Additionally, the dilution network 500 produces a diluted binary mask $<M_i>$ that has 0s where $<V_i>=0$, is elsewhere. The dilution network 500 then feeds $<X_i>$ back through in place of $<X_0>$ and repeats the process until $<M_i>=1$ everywhere.

FIG. 6 depicts the dilution network 500 as a first system of equations for dilating the point data 308 or $<X_0>$ to fill the grid 300. In FIG. 6, $<g>=<X_0>$ is a matrix of the measured point data $<X_0>$. $<W>$ is a matrix of weights developed by the neural network architecture 500. $<X_n>$ is a matrix of raster data extrapolated from $<g>$ by iteratively applying $<W>$ as shown. Depending on the weight matrix W used in the dilution network, which is of course learned, the result can exhibit very different features such as non-isotropy. That is, the weight matrix could prefer a certain direction in the raster over another.

Figure 7:
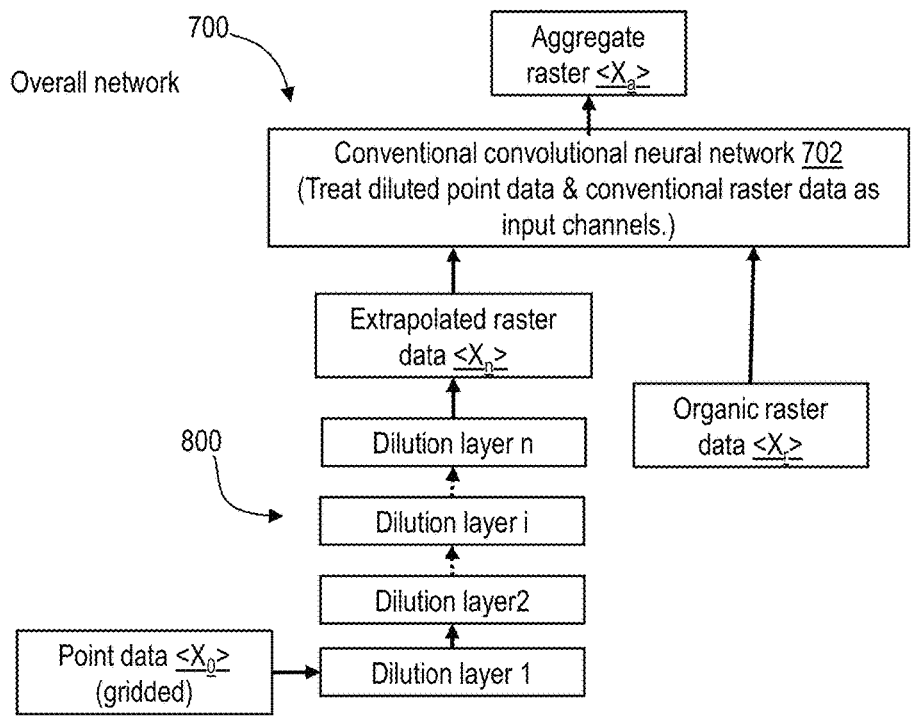
FIG. 7 depicts a second neural network architecture for dilating point data to fill a grid.

Alternatively, FIG. 7 depicts a second neural network architecture 700 for dilating the point data 308 to fill the grid 300. The point data 308 is input to the architecture 700. A dilution network 800 produces the extrapolated raster data 302, 304, 306 by sequentially applying a plurality of weight matrices or filters $<W_0 \ldots W_n>$ to the point data 308. The convolutional filters $<W_0 \ldots W_n>$ have been trained on historical point data with historical raster data as the ground truth. Note that the historical raster data may include measurements, predictions, or both. Then the point data 308 and the extrapolated raster data 302, 304, 306 are input to a conventional convolutional network 702 along with organic raster data 704. The convolutional network 702 outputs an aggregate raster 706, which incorporates the extrapolated raster data 302, 304, 306, point data 308, and regular raster data 704.

Figure 8:
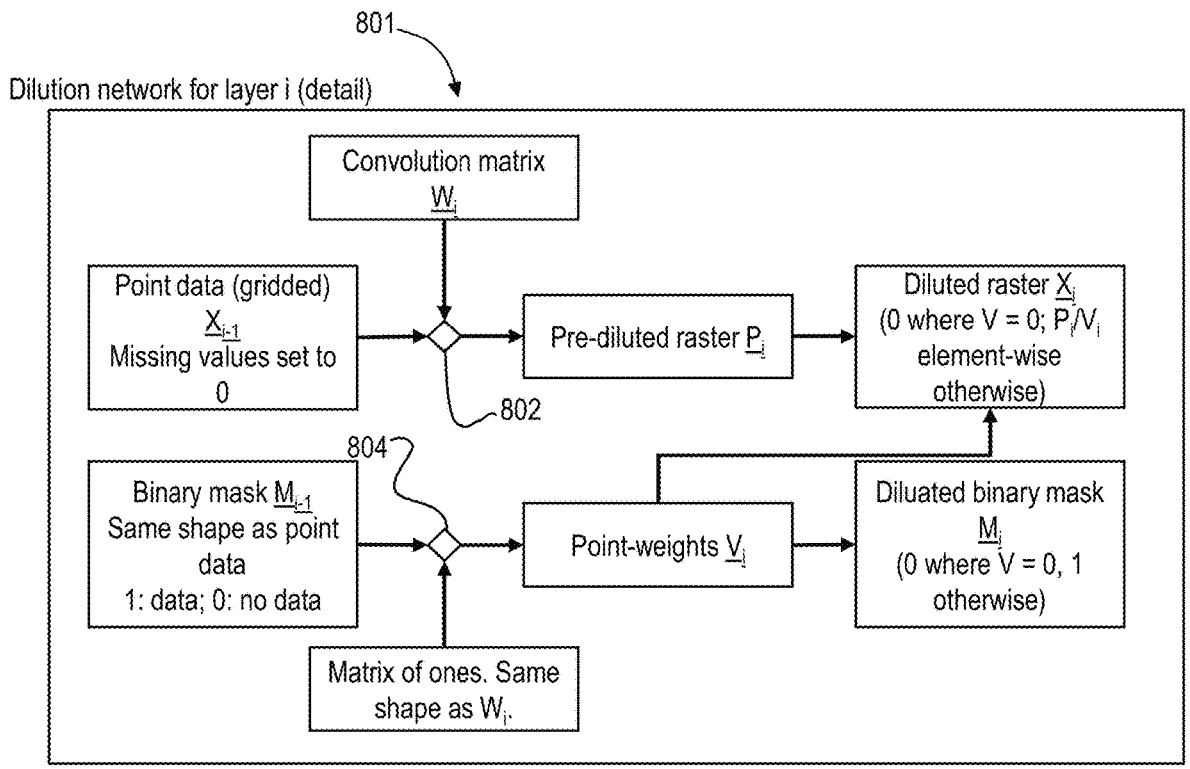
FIG. 8 depicts a detailed schematic view of a second dilution network for obtaining raster data from point data.

FIG. 8 depicts in a schematic a layer 801 of the dilution network 800, which in one or more embodiments is implemented as a multi-layered convolutional network. Layer 801 includes a convolution matrix (kernel or filter) $<W_i>$ (i.e. a matrix of weight values between 0 and 1), a binary mask $<M_i>$ (i.e. a matrix of 1s and 0s in which the is match the shape of the point data 308), and matrix of 1s $<O_i>$, which is the same shape as the corresponding kernel $<W_i>$. Layer 801 also includes a cross-multiplier 802, which produces pre-diluted rasters $<P_i>$ by combining the convolution matrix $<W_i>$ with the point data 308 (if layer 801 is the initial layer in the dilution network 800) or with one of the extrapolated raster data sets 302, 304, 306, etc. (if layer 801 is a subsequent layer in the dilution network 800). The dilution network 800 also includes a cross-multiplier 804, which produces a matrix of point-weights $<V_i>$ by combining the matrix of 1s $<O_i>$ with the binary mask $<M_i>$. Layer 801 further combines the matrix of point-weights $<V_i>$ with the pre-diluted raster $<P_i>$ to obtain a diluted raster $<X_i>$ that has 0s where $<V_i>=0$ and values $P_i/V_i$ where $<V_i>$ does not equal 0. Additionally, layer 801 produces a diluted binary mask $<M_i>$ that has 0s where $<V_i>=0$, is elsewhere. Layer 801 then feeds $<X_i>$, $<M_i>$ to the next layer. The kernels $<W>$ of the dilution network 800 are trained until $<M_n>=1$ everywhere. The shape of $X_0$ is set a priori. Note that all $X_i$ have the same shape (this requires suitable 0-padding, which is implied; padded data is treated as no-data values). So the overall shape does not change in either this or the previous embodiment of the invention. The shape is chosen depending on the subsequent learning task desired. (Thinking of a geospatial application, the raster spacing is related to a spatial resolution, overall raster size describes the area covered by the data.)

FIG. 9 depicts a second system of equations 900 for dilating the point data $<X_0>$ to fill the grid 300. In FIG. 9, $<g>=<X_0>$ is a matrix of the measured point data $<X_0>$. $<W_i>$ is a set of matrices of weights learned by the dilution network 800 based on historical point data as the training data and historical raster data as the ground truth. $<M_i>$ is a set of masks corresponding to locations of data within the corresponding matrices $<X_i>$. $<X_0>$ is a matrix of raster data that is extrapolated from $<g>$ by applying $<W>$, $<M>$ through the multiple layers of the dilution network 800 as shown in FIG. 8.

Figure 10:
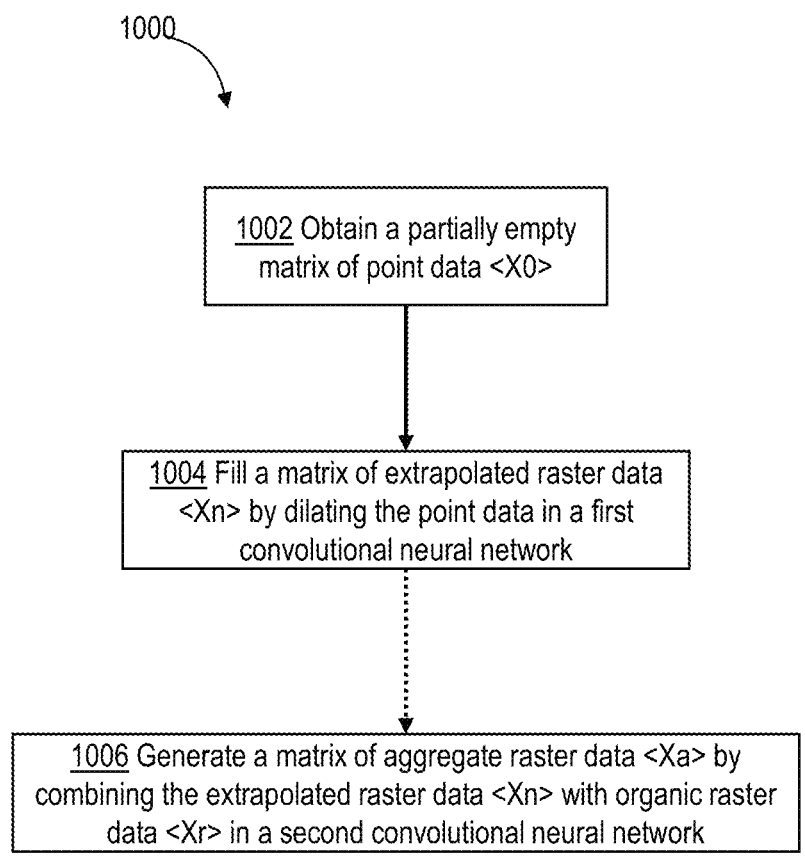
FIG. 10 depicts a flowchart of a method for dilating point data to fill a grid, according to an exemplary embodiment.

Given the discussion thus far, and with reference to accompanying FIG. 10, it will be appreciated that, in general terms, an exemplary method 1000 for operating a computer to produce predictions throughout a raster field in response to point data, according to an aspect of the invention, includes at 1002 obtaining a partially empty matrix of point data $<X0>$; at 1004 filling a matrix of extrapolated raster data $<Xn>$ by dilating the point data in a first convolutional neural network; and at 1006 generating a matrix of aggregate raster data $<Xa>$ by combining the extrapolated raster data $<Xn>$ with organic raster data $<Xr>$ in a second convolutional neural network.

In one or more embodiments, the first convolutional neural network is a recurrent convolutional neural network (RCNN).

In one or more embodiments, the first convolutional neural network includes a kernel $<W>$, a ones matrix $<O>$ that is of the same shape as $<W>$, and a binary mask $<M>$ that is initially of the same shape as $<X0>$ and that is updated through iterations i=1 . . . n to match the shape of $<Xi>$, and the first convolutional neural network generates $\langle Xi \rangle$ at each iteration by multiplication of $\langle Xi-1 \rangle$, $\langle W \rangle$, $\langle O \rangle$, and $\langle Mi-1 \rangle$ and iterates until $\langle Mn \rangle$ at a final iteration n is filled with 1s.

In one or more embodiments, the first convolutional neural network is trained on historical raster data as the ground truth and historical point data as the input data.

In one or more embodiments, the first convolutional neural network is a layered network, which includes a plurality of kernels $\langle Wi \rangle$ each corresponding to one of the layers $i=1 \ldots n$ of the layered network, a plurality of ones matrices $\langle Oi \rangle$ that are of the same shape as corresponding kernels $\langle Wi \rangle$, and a plurality of binary masks $\langle Mi \rangle$ that are of the same shape as corresponding data $\langle Xi \rangle$, wherein during training the first convolutional neural network generates $\langle Xi \rangle$ at each layer by multiplication of $\langle Xi-1 \rangle$, $\langle Wi \rangle$, $\langle Oi \rangle$, and $\langle Mi-1 \rangle$ and learns the kernel $\langle Wi \rangle$ for each layer i such that $\langle Mn \rangle$ is filled with 1s at a final layer n of the layered network.

In one or more embodiments, during inference the first convolutional neural network produces a filled grid of raster data from input point data of the same shape as the original training data $\langle X0 \rangle$.

In one or more embodiments, the first convolutional neural network is implemented in artificial neurons.

Figure 11:
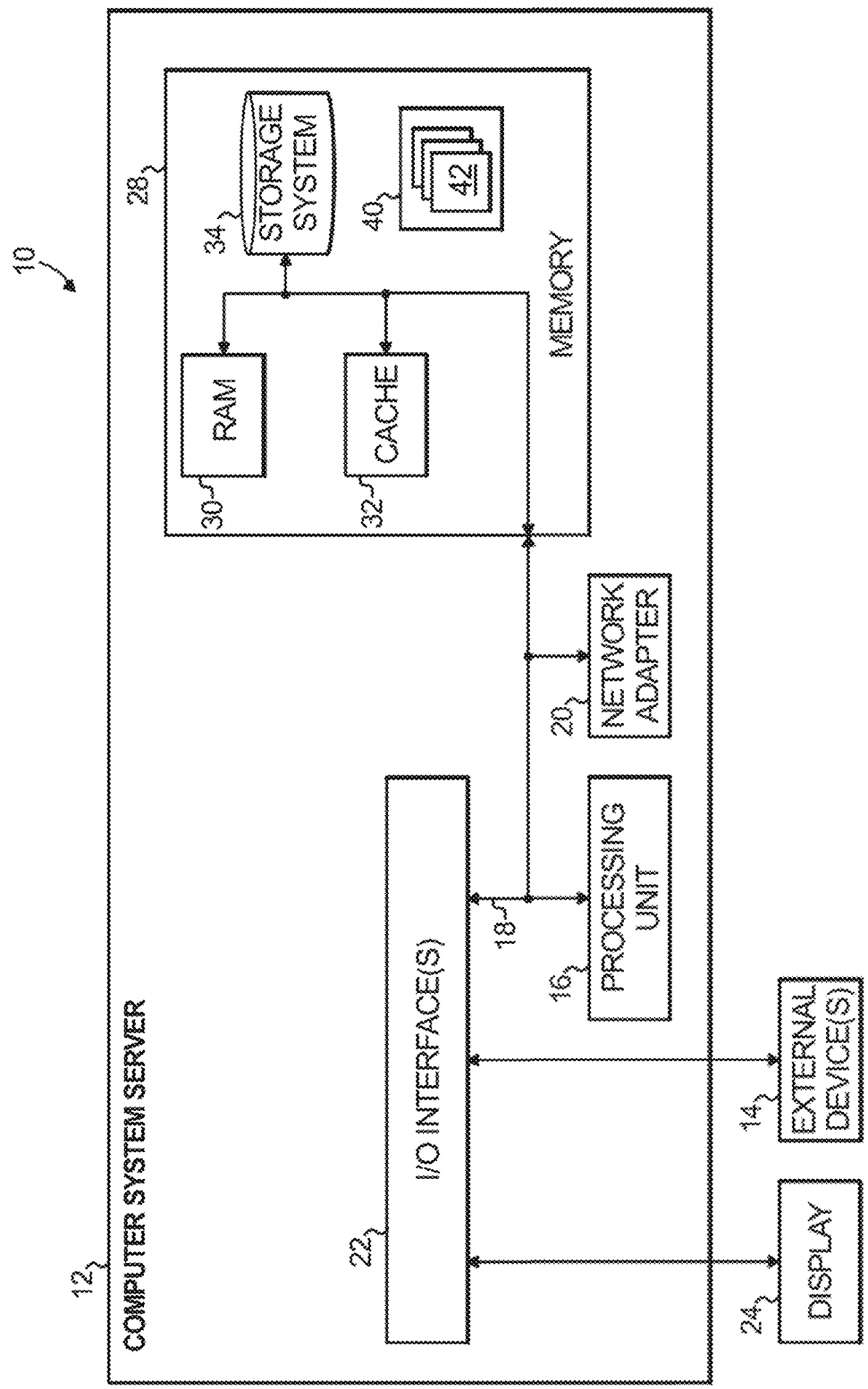
FIG. 11 depicts a computer system that may be useful in implementing one or more aspects and/or elements of the invention.

One or more embodiments of the invention, or elements thereof, can be implemented in the form of an apparatus including a memory and at least one processor that is coupled to the memory and operative to perform exemplary method steps, or in the form of a non-transitory computer readable medium embodying computer executable instructions which when executed by a computer cause the computer to perform exemplary method steps. FIG. 11 depicts a computer system 10 that may be useful in implementing one or more aspects and/or elements of the invention. Computing system 10 is capable of being implemented and/or performing any of the functionality set forth hereinabove.

In computing system 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in computing system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 11, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 11) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for operating a computer to produce predictions throughout a raster field in response to point data, the method comprising:
   obtaining a partially empty matrix of point data $<X_0>$, wherein the point data comprises values at spatial locations;
   filling a matrix of extrapolated raster data $<X_n>$ by dilating the point data in a first convolutional neural network by inference, wherein dilating the point data causes the extrapolated raster data to comprise a greater number of values and spatial locations than the point data; and
   generating a matrix of aggregate raster data $<X_a>$ by combining the extrapolated raster data $<X_n>$ with organic raster data $<X_r>$ in a second convolutional neural network,
   wherein during inference the first convolutional neural network produces a filled grid of raster data from input point data of the same shape as the original training data $<X_0>$.

2. The method of claim 1 wherein the first convolutional neural network is a recurrent convolutional neural network (RCNN).

3. The method of claim 2 wherein the first convolutional neural network includes a kernel $<W>$, a ones matrix $<O>$ that is of the same shape as $<W>$, and a binary mask $<M>$ that is initially of the same shape as $<X_0>$ and that is updated through iterations i=1n to match the shape of $<X_i>$, wherein the first convolutional neural network generates $<X_i>$ at each iteration by multiplication of $<X_{i-1}>$, $<W>$, $<O>$, and $<M_{i-1}>$ and iterates until $<M_n>$ at a final iteration n is filled with 1s.

4. The method of claim 3 wherein the first convolutional neural network is trained on historical raster data as the ground truth and historical point data as the input data.

5. The method of claim 1 wherein the first convolutional neural network is a layered network, which includes a plurality of kernels $<W_i>$ each corresponding to one of the layers i=1n of the layered network, a plurality of ones matrices $<O_i>$ that are of the same shape as corresponding kernels $<W_i>$, and a plurality of binary masks $<M_i>$ that are of the same shape as corresponding data $<X_i>$, wherein during training the first convolutional neural network generates $<X_i>$ at each layer by multiplication of $<X_{i-1}>$, $<W_i>$, $<O_i>$, and $<M_{i-1}>$ and learns the kernel $<W_i>$ for each layer i such that $<M_n>$ is filled with 1s at a final layer n of the layered network.

6. The method of claim 1 wherein the first convolutional neural network is implemented in artificial neurons.

7. A non-transitory computer readable medium embodying computer executable instructions which when executed by a computer cause the computer to facilitate a method of:
obtaining a partially empty matrix of point data $<X_0>$, wherein the point data comprises values at spatial locations;
filling a matrix of extrapolated raster data $<X_n>$ by dilating the point data in a first convolutional neural network by inference, wherein dilating the point data causes the extrapolated raster data to comprise a greater number of values and spatial locations than the point data; and
generating a matrix of aggregate raster data $<X_a>$ by combining the extrapolated raster data $<X_n>$ with organic raster data $<X_r>$ in a second convolutional neural network
wherein during inference the first convolutional neural network produces a filled grid of raster data from input point data of the same shape as the original training data $<X_0>$.

8. The computer readable medium of claim 7 wherein the first convolutional neural network is a recurrent convolutional neural network (RCNN).

9. The computer readable medium of claim 8 wherein the first convolutional neural network includes a kernel $<W>$, a ones matrix $<O>$ that is of the same shape as $<W>$, and a binary mask $<M>$ that is initially of the same shape as $<X_0>$ and that is updated through iterations i=1n to match the shape of $<X_i>$, wherein the first convolutional neural network generates $<X_i>$ at each iteration by multiplication of $<X_{i-1}>$, $<W>$, $<O>$, and $<M_{i-1}>$ and iterates until $<M_n>$ at a final iteration n is filled with 1s.

10. The computer readable medium of claim 9 wherein the first convolutional neural network is trained on historical raster data as the ground truth and historical point data as the input data.

11. The computer readable medium of claim 7 wherein the first convolutional neural network is a layered network, which includes a plurality of kernels $<W_i>$ each corresponding to one of the layers i=1n of the layered network, a plurality of ones matrices $<O_i>$ that are of the same shape as corresponding kernels $<W_i>$, and a plurality of binary masks $<M_i>$ that are of the same shape as corresponding data $<X_i>$, wherein during training the first convolutional neural network generates $<X_i>$ at each layer by multiplication of $<X_{i-1}>$, $<W_i>$, $<O_i>$, and $<M_{i-1}>$ and learns the kernel $<W_i>$ for each layer i such that $<M_n>$ is filled with 1s at a final layer n of the layered network.

12. An apparatus comprising:
a memory embodying computer executable instructions; and
at least one processor, coupled to the memory, and operative by the computer executable instructions to facilitate a method of:
obtaining a partially empty matrix of point data $<X_0>$, wherein the point data comprises values at spatial locations;
filling a matrix of extrapolated raster data $<X_n>$ by dilating the point data in a first convolutional neural network by inference, wherein dilating the point data causes the extrapolated raster data to comprise a greater number of values and spatial locations than the point data; and
generating a matrix of aggregate raster data $<X_a>$ by combining the extrapolated raster data $<X_n>$ with organic raster data $<X_r>$ in a second convolutional neural network
wherein during inference the first convolutional neural network produces a filled grid of raster data from input point data of the same shape as the original training data $<X_0>$.

13. The apparatus of claim 12 wherein the first convolutional neural network is a recurrent convolutional neural network (RCNN).

14. The apparatus of claim 13 wherein the first convolutional neural network includes a kernel $<W>$, a ones matrix $<O>$ that is of the same shape as $<W>$, and a binary mask $<M>$ that is initially of the same shape as $<X_0>$ and that is updated through iterations i=1n to match the shape of $<X_i>$, wherein the first convolutional neural network generates $<X_i>$ at each iteration by multiplication of $<X_{i-1}>$, $<W>$, $<O>$, and $<M_{i-1}>$ and iterates until $<M_n>$ at a final iteration n is filled with 1s.

15. The apparatus of claim 14 wherein the first convolutional neural network is trained on historical raster data as the ground truth and historical point data as the input data.

16. The apparatus of claim 12 wherein the first convolutional neural network is a layered network, which includes a plurality of kernels $<W_i>$ each corresponding to one of the layers i=1n of the layered network, a plurality of ones matrices $<O_i>$ that are of the same shape as corresponding kernels $<W_i>$, and a plurality of binary masks $<M_i>$ that are of the same shape as corresponding data $<X_i>$, wherein during training the first convolutional neural network generates $<X_i>$ at each layer by multiplication of $<X_{i-1}>$, $<W_i>$, $<O_i>$, and $<M_{i-1}>$ and learns the kernel $<W_i>$ for each layer i such that $<M_n>$ is filled with 1s at a final layer n of the layered network.

17. The apparatus of claim 12 wherein the first convolutional neural network is implemented in artificial neurons.

* * * * *